US012597305B2

(12) United States Patent
Tartal et al.

(10) Patent No.: US 12,597,305 B2
(45) Date of Patent: Apr. 7, 2026

(54) LOCKING SYSTEM

(71) Applicant: United States Postal Service, Washington, DC (US)

(72) Inventors: William Albert Tartal, Baltimore, MD (US); Gabriel Michael Yessin, Arlington, VA (US); Robert E. Dalton, Jr., Greenville, SC (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 18/496,583

(22) Filed: Oct. 27, 2023

(65) Prior Publication Data

US 2024/0054828 A1 Feb. 15, 2024

Related U.S. Application Data

(63) Continuation of application No. 17/448,182, filed on Sep. 20, 2021, now Pat. No. 11,804,085, which is a continuation of application No. 16/580,597, filed on Sep. 24, 2019, now Pat. No. 11,127,233.

(60) Provisional application No. 62/736,674, filed on Sep. 26, 2018.

(51) Int. Cl.
*G07C 9/00* (2020.01)
*E05B 47/02* (2006.01)

(52) U.S. Cl.
CPC ........ *G07C 9/00309* (2013.01); *E05B 47/026* (2013.01); *G07C 9/00912* (2013.01); *G07C 2009/00396* (2013.01); *G07C 2009/00769* (2013.01); *G07C 2009/00968* (2013.01); *G07C 2209/63* (2013.01)

(58) Field of Classification Search
None
See application file for complete search history.

(56) References Cited

U.S. PATENT DOCUMENTS

| | | | |
|---|---|---|---|
| 3,889,501 | A | 6/1975 | Fort |
| 4,789,859 | A | 12/1988 | Clarkson et al. |
| 5,140,317 | A | 8/1992 | Hyatt, Jr. et al. |
| 5,219,386 | A | 6/1993 | Kletzmaier et al. |

(Continued)

FOREIGN PATENT DOCUMENTS

| | | | |
|---|---|---|---|
| CN | 101573502 | A | 11/2009 |
| CN | 107724814 | A | 2/2018 |

(Continued)

OTHER PUBLICATIONS

International Search Report & Written Opinion dated Sep. 25, 2018 in International Application No. PCT/US2018/037159 filed Jun. 12, 2018.

(Continued)

*Primary Examiner* — Carlos Garcia
(74) *Attorney, Agent, or Firm* — KNOBEE, MARTENS, OLSON & BEAR, LLP

(57) ABSTRACT

Locking systems and devices and methods for using the systems and devices are provided. A locking system may include a receptacle having a lock and an electronic credential. If the electronic credential is brought into proximity of the receptacle, then a key can be used to open the lock. The electronic credential can be incorporated into a vehicle or into a handheld device.

18 Claims, 10 Drawing Sheets

(56) References Cited

U.S. PATENT DOCUMENTS 5,272,894 A * 12/1993 Stillwagon ............ F16B 7/1409 70/34
6,005,487 A 12/1999 Hyatt, Jr. et al.
7,710,245 B2 * 5/2010 Pickering ............ B60R 25/2045 340/426.36
8,791,804 B2 7/2014 Campbell et al.
8,922,333 B1 12/2014 Kirkjan
9,378,597 B2 6/2016 Shen et al.
9,728,022 B2 8/2017 Gengler et al.
10,544,624 B2 1/2020 Baker et al.
11,313,152 B2 4/2022 Tartal et al.
11,590,862 B2 * 2/2023 Yetukuri ............... H04L 67/306
11,732,506 B2 8/2023 Tartal
2002/0180582 A1 12/2002 Nielsen
2003/0160681 A1 8/2003 Menard et al.
2004/0032131 A1 2/2004 Cherry
2005/0285716 A1 12/2005 Denison et al.
2007/0096866 A1 5/2007 Denison et al.
2007/0173253 A1 7/2007 Duan et al.
2007/0257773 A1 11/2007 Hill et al.
2008/0150684 A1 * 6/2008 Gartner .............. G07C 9/00309 345/169
2009/0273440 A1 11/2009 Marschalek et al.
2009/0282876 A1 11/2009 Zuraski et al.
2009/0302995 A1 12/2009 Park
2010/0073133 A1 3/2010 Conreux et al.
2011/0181053 A1 7/2011 Marschner et al.
2012/0270496 A1 10/2012 Kuenzi et al.
2013/0067969 A1 3/2013 Webb et al.
2013/0317693 A1 * 11/2013 Jefferies ............. G06Q 30/0645 701/31.5
2013/0332007 A1 12/2013 Louboutin
2013/0342314 A1 * 12/2013 Chen .................. G07C 9/00309 340/5.65
2014/0120905 A1 * 5/2014 Kim ........................ H04W 4/80 455/426.1
2014/0149269 A1 5/2014 Kantarjiev et al.
2014/0353983 A1 * 12/2014 Vetter ..................... E05C 3/042 292/197
2015/0027178 A1 1/2015 Scalisi
2015/0141045 A1 5/2015 Qiu et al.
2015/0184426 A1 7/2015 Arlinghaus et al.
2015/0211258 A1 7/2015 Gokcebay
2015/0221152 A1 8/2015 Andersen
2015/0282581 A1 * 10/2015 Chen ..................... E05B 63/123 70/64
2015/0332527 A1 11/2015 Pukari
2016/0042582 A1 2/2016 Hyde et al.
2016/0055694 A1 2/2016 Saeedi et al.
2016/0086400 A1 3/2016 Dumas et al.
2016/0098871 A1 4/2016 Oz et al.
2016/0186463 A1 6/2016 Roatis et al.
2016/0217637 A1 7/2016 Gengler et al.
2016/0232484 A1 8/2016 Skaaksrud
2016/0275450 A1 9/2016 Chang
2017/0002586 A1 1/2017 Lee
2017/0030111 A1 * 2/2017 Vetter ........................ E05C 3/06
2017/0124510 A1 5/2017 Caterino et al.
2017/0328130 A1 11/2017 Baker et al.
2018/0060800 A1 3/2018 Robinson
2018/0075679 A1 3/2018 Niroomand
2018/0300677 A1 10/2018 Wilkinson et al.
2019/0246276 A1 * 8/2019 Lingala ................. H04W 12/08
2020/0294340 A1 * 9/2020 Myers ................ G07C 9/00571
2021/0010315 A1 * 1/2021 Honjo ...................... E05F 15/71
2021/0074092 A1 * 3/2021 Davis ................. G07C 9/00571
2022/0223013 A1 * 7/2022 Persson ............... G06F 3/04847
2022/0408261 A1 * 12/2022 Everson ................ H04W 12/06
2023/0098945 A1 * 3/2023 Elfström ................... G01S 5/14 455/456.1
2023/0162548 A1 * 5/2023 Ruffkess ............. E05B 19/0005 70/263
2024/0054828 A1 * 2/2024 Tartal ................. G07C 9/00944

FOREIGN PATENT DOCUMENTS

CN 107829616 A 3/2018
EP 2876234 A1 5/2015
JP 2008-540880 A 11/2008

OTHER PUBLICATIONS

International Search Report & Written Opinion dated Aug. 27, 2019 in International Application No. PCT/US2019/032250 filed May 14, 2019.
International Search Report and Written Opinion mailed Dec. 16, 2019 in International Application No. PCT/US2019/52659 filed Sep. 24, 2019.
International Preliminary Report on Patentability dated Dec. 17, 2019 in International Application No. PCT/US2018/037159 filed Jun. 12, 2018.
International Preliminary Report on Patentability mailed Nov. 26, 2020 in International Application No. PCT/US2019/032250 filed May 14, 2019.
International Preliminary Report on Patentability dated Apr. 8, 2021 in International Application No. PCT/US2019/052659 filed Sep. 24, 2019.

* cited by examiner

LOCKING SYSTEM

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. This application is a continuation of U.S. application Ser. No. 17/448,182 filed Sep. 20, 2021, entitled LOCKING SYSTEM, which is a continuation of U.S. application Ser. No. 16/580,597, filed Sep. 24, 2019, now U.S. Pat. No. 11,127,233, issued on Sep. 21, 2021, entitled LOCKING SYSTEM, which claims the benefit of U.S. Provisional Application Ser. No. 62/736,674, filed Sep. 26, 2018, entitled LOCKING SYSTEM.

BACKGROUND

Field of the Disclosure

Disclosed are locking systems and devices, and methods of using the locking systems and devices.

Description of the Related Art

Many types of containers use a bolt system to lock and unlock an openable door. Some types of containers using bolt systems may include lockers, receptacles, storage cabinets, or storage rooms. The bolt system may rely on leveraging a mechanical interface to extend a bolt to lock the door to the container or retract the bolt and open the door to the container. The mechanical interface may include a key that may be inserted and rotated within a lock. As keys may be duplicated or locks can be forcibly turned by other mechanical means, existing bolt systems may provide inadequate protection for the contents of the container.

SUMMARY

In a first aspect, a locking system is provided. The locking system includes a housing having an integrated lock, the integrated lock including an insertion port on an outside of the housing, a key shaped and configured to mate with the insertion port, and an electronic credential configured to wirelessly communicate with the integrated lock.

In some embodiments, the electronic credential is embedded within a vehicle. In some embodiments, the electronic credential is part of a handheld device. In some embodiments, the locking system further includes a global positioning system (GPS) configured to determine if the handheld device is along a prescribed route. In some embodiments, the integrated lock includes a bolt configured to extend from the lock and retract into the lock. In some embodiments, the integrated lock includes electronics and a cover positioned over the electronics, the cover attached to the integrated lock by one or more securing members, such as screws. In some embodiments, the electronics include a wire and an antenna.

In a second aspect, a method for opening a lock is provided. The method includes providing a lock with an insertion port, bringing an electronic credential in proximity to the lock, inserting a key into the insertion port, and rotating the key to open the lock.

In some embodiments, the proximity between the electronic credential and the lock is 100 yards. In some embodiments, the proximity is 10 yards. In some embodiments, the proximity is 3 yards. In some embodiments, the method further includes determining whether the lock is on or part of a predetermined route, and if not, the lock will not be mechanically openable. In some embodiments, the method further includes determining whether the lock is on or part of a predetermined route, and if so, the lock will be mechanically openable. In some embodiments, the determination is made through use of a global positioning system (GPS) or a series of sensors or a number of cell phone towers. In some embodiments, the rotating the key to open the lock includes turning the key clockwise a quarter turn. In some embodiments, the rotating the key to open the lock includes turning the key clockwise a half turn. In some embodiments, the rotating the key to open the lock includes turning the key clockwise three quarters turn. In some embodiments, the rotating the key to open the lock includes turning the key clockwise a full turn. In some embodiments, the rotating the key to open the lock includes turning the key counterclockwise a quarter turn. In some embodiments, the rotating the key to open the lock includes turning the key counterclockwise a half turn. In some embodiments, the rotating the key to open the lock includes turning the key counterclockwise three quarters turn. In some embodiments, the rotating the key to open the lock includes turning the key counterclockwise a full turn.

In a third aspect, a handheld device is provide. The handheld device includes an electronic credential electronically coupled to a locking system, a touchscreen, and an antenna for transmitting and receiving radiofrequency signals from the locking system.

In some embodiments, the touchscreen shows a locking logo representing a locked state of the locking system, and wherein when the locking logo is on the touchscreen and the handheld device is in proximity to a receptacle, the lock will not be mechanically openable. In some embodiments, the touchscreen shows an unlocking logo representing an unlocked state of the locking system, wherein when the unlocking logo is on the touchscreen and the handheld device is in proximity to a receptacle, the lock with be mechanically openable by the insertion and turning of a key. In some embodiments, a touch to the touchscreen will change the image of the locking logo to the unlocking logo or change the image of the unlocking logo to the locking logo. In some embodiments, the touch is a tap or swipe of a user's finger or a stylus on the touchscreen. In some embodiments, the device further comprises one or more buttons, and wherein changing the locking logo to the unlocking logo or changing the unlocking logo to the locking logo requires pressing the one or more buttons.

In a fourth aspect, a locking system, comprises a housing having a lock, the lock including an insertion port on an outside of the housing; a key shaped and configured to mate with the insertion port; and an electronic credential device configured to wirelessly communicate an electronic credential to the lock to enable operation of the lock.

In some embodiments, the electronic credential device is embedded within a vehicle. In some embodiments, the electronic credential is communicated via a handheld device. In some embodiments, the locking system further comprises a global positioning system (GPS) configured to determine if the handheld device is along a prescribed route. In some embodiments, the lock includes a bolt configured to extend from the lock and retract into the lock. In some embodiments, the lock includes a bolt block configured to prevent retraction of the bolt, and wherein the bolt block is retractable to allow retraction of the bolt based on receiving the electronic credential from the electronic credential device. In some embodiments, the lock further comprises a biasing element configured to bias the bolt block toward a first position in which the bolt block prevents retraction of the bolt; and a motor configured to move the bolt block against the biasing element to a second position in which the bolt block does not prevent retraction of the bolt. In some embodiments, the electronic credential device is configured to enable mechanical operation of the lock when the electronic credential device is in proximity to the lock. In some embodiments, the electronic credential device is configured to enable mechanical operation by communicating an electronic credential to the lock, and the lock is configured to receive and verify the electronic credential before allowing mechanical operation of the lock.

In a fifth aspect, a method for opening a lock having an insertion port comprises bringing an electronic credential device in proximity to the lock; communicating an electronic credential to the lock; enabling operation of the lock in response to the communicated electronic credential; inserting a key into the insertion port; and operating the key to open the lock.

In some embodiments, the method further comprises determining that the lock is on a predetermined route associated with the electronic credential device, wherein operation of the lock is enabled based in part on determining that the lock is on the predetermined route. In some embodiments, enabling operation of the lock comprises retracting a bolt block to allow retraction of a bolt of the lock. In some embodiments, the method further comprises bringing a second electronic credential device in proximity to the lock; communicating a second electronic credential to the lock; determining that the lock is not on a second predetermined route associated with the second electronic credential device; and preventing operation of the lock in response to the communicated second electronic credential.

In a sixth aspect, a handheld device, comprises an electronic credential electronically coupled to a locking system; a touchscreen; and an antenna for transmitting and receiving radiofrequency signals from the locking system, wherein the electronic credential, when transmitted by the antenna to the locking system, causes actuation of the locking system to permit mechanical operation of the locking system.

In some embodiments, the touchscreen includes a locking logo representing a locked state of the locking system, and when the locking logo is on the touchscreen and the handheld device is in proximity to a receptacle, the lock will not be mechanically openable. In some embodiments, the touchscreen includes an unlocking logo representing an unlocked state of the locking system, wherein when the unlocking logo is on the touchscreen and the handheld device is in proximity to a receptacle, the lock with be mechanically openable by the insertion and turning of a key. In some embodiments, a touch to the touchscreen will change the locking logo to the unlocking logo or change the unlocking logo to the locking logo. In some embodiments, the touch is a tap or swipe of a user's finger or a stylus on the touchscreen. In some embodiments, the device further comprises one or more buttons, and wherein changing the locking logo to the unlocking logo or changing the unlocking logo to the locking logo requires pressing the one or more buttons. In some embodiments, the actuation of the locking system comprises activation of an electric motor to retract a bolt block that prevents mechanical operation of the locking system.

In a seventh aspect, an electronic lock comprises a housing; a mechanical lock disposed at least partially within the housing, the mechanical lock comprising a bolt configured to extend from and retract into the housing; and a blocking assembly disposed at least partially within the housing. The blocking assembly comprises a bolt block movable between a first position in which the bolt block prevents retraction of the bolt into the housing and a second position in which the bolt block does not prevent retraction of the bolt into the housing; a motor operable to move the bolt block between the first position and the second position; and processing circuitry configured to operate the motor to move the bolt block from the first position to the second position.

In some embodiments, the processing circuitry is further configured to wirelessly receive an electronic credential from a computing device in proximity to the electronic lock, and the processing circuitry operates the motor to move the bolt block from the first position to the second position in response to receiving the electronic credential. In some embodiments, the computing device is a handheld mobile device or a vehicle-mounted mobile device, the computing device configured to send the electronic credential to the processing circuitry based at least in part on the location of the computing device. In some embodiments, the computing device is configured to send the electronic credential to the processing circuitry based in part on determining that the computing device is along a predetermined route. In some embodiments, the computing device sends the electronic credential to the processing circuitry automatically based on determining that the computing device is in proximity to the electronic lock. In some embodiments, the processing circuitry is further configured to authenticate the electronic credential prior to operating the motor. In some embodiments, the blocking assembly further comprises a biasing element that biases the bolt block toward the first position. In some embodiments, the first position of the bolt block prevents mechanical operation of the lock.

In an eighth aspect, a method for operating an electric lock comprises receiving, at processing circuitry of the electric lock, a first electronic credential from a mobile device in proximity to the electronic lock; authenticating the received first electronic credential; and enabling mechanical operation of the electronic lock by a key in response to authenticating the received first electronic credential.

In some embodiments, enabling mechanical operation of the electronic lock comprises actuating an electric motor of the electronic lock to withdraw a bolt block from an extended position in which the bolt block prevents retraction of the bolt into the electronic lock. In some embodiments, the extended position is a position in which the bolt block is at least partially disposed within a retraction path of the bolt. In some embodiments, the method further comprises transmitting the first electronic credential from the mobile device to the processing circuitry. In some embodiments, the first electronic credential is transmitted from the mobile device to the processing circuitry based on a location of the mobile device. In some embodiments, the method further comprises determining, by the mobile device, the location of the mobile device; and determining, by the mobile device, that the location of the mobile device is along a predetermined route associated with the mobile device, wherein the mobile device transmits the first electronic credential based on determining that the mobile device is along the predetermined route. In some embodiments, the mobile device determines the location of the mobile device based on a GPS signal or based on detecting the electronic lock. In some embodiments, the mobile device is configured to prevent transmission of the first electronic credential based on determining that the location of the mobile device is not along the predetermined route. In some embodiments, the mobile device stores a plurality of electronic credentials including the first electronic credential, and the mobile device selects the first electronic credential from the plurality of electronic credentials based on the location of the mobile device. In some embodiments, the method further comprises, subsequent to enabling mechanical operation of the electronic lock, disabling mechanical operation of the electronic lock.

BRIEF DESCRIPTION OF THE DRAWINGS

Features of the present disclosure will become more fully apparent from the following description and appended claims, taken in conjunction with the accompanying drawings. It will be understood that these drawings depict only certain embodiments in accordance with the disclosure and, therefore, are not to be considered limiting of its scope; the disclosure will be described with additional specificity and detail through use of the accompanying drawings. An apparatus, system, or method according to some of the described embodiments can have several aspects, no single one of which necessarily is solely responsible for the desirable attributes of the apparatus, system, or method. After considering this discussion, and particularly after reading the section entitled "Detailed Description of Certain Inventive Embodiments" one will understand how illustrated features serve to explain certain principles of the present disclosure.

DETAILED DESCRIPTION

Figure 1:
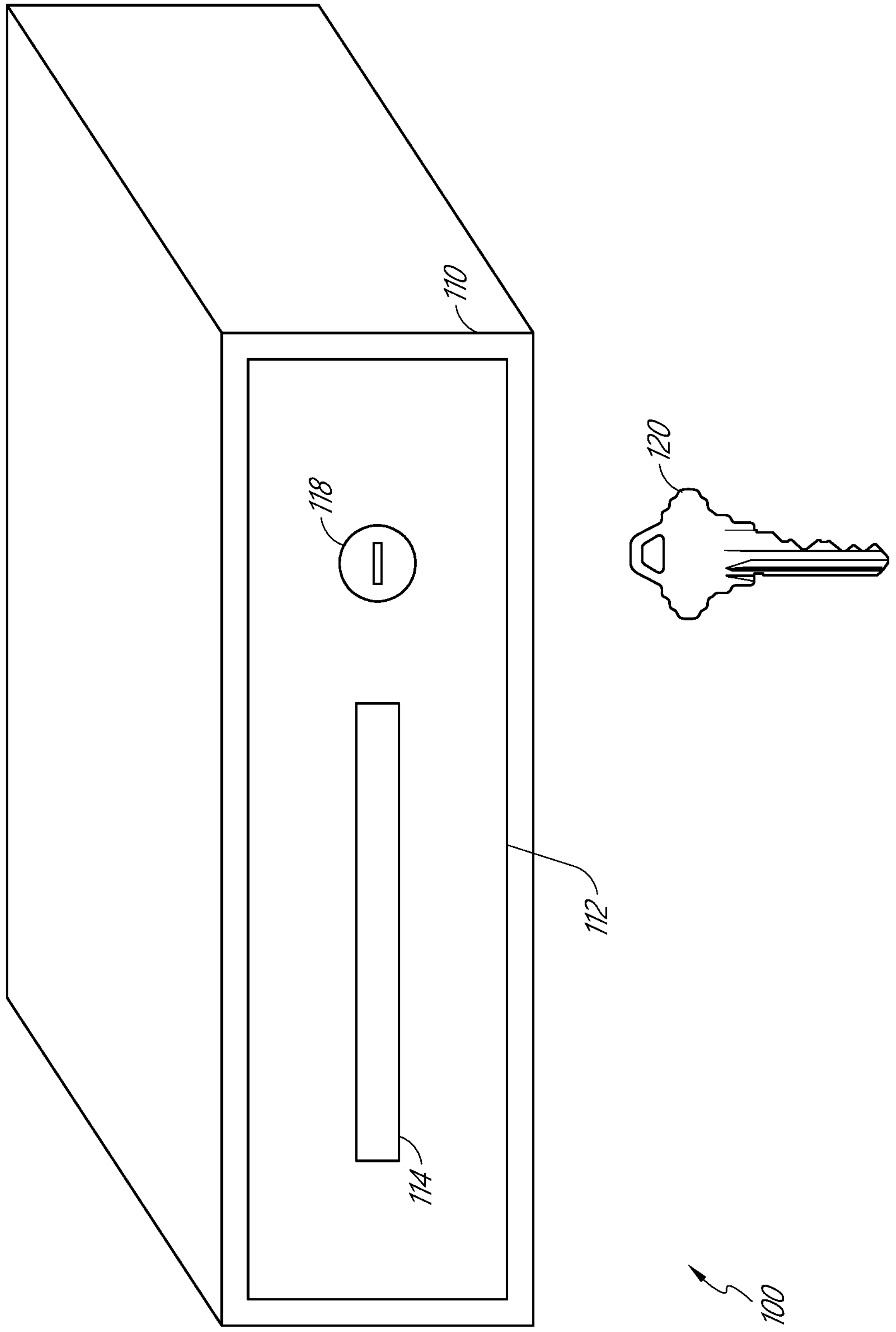
FIG. 1 is a perspective view of a receptacle system known in the art.

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

FIG. 1 illustrates a receptacle system 100 known in the prior art. The receptacle system 100 includes a receptacle 110 for receiving outgoing mail. The receptacle 110 includes a door 112. The door 112 includes a mail slot 114 configured to receive items, such as mail (e.g., letters, postcards, flats, parcels, and the like) into the interior of the receptacle 110. The system 100 further includes a lock 118 with a keyhole facing outward and configured to matingly receive a key 120. The lock 118 also includes a locking mechanism hidden from view. The receptacle system 100 includes a key 120 that fits into the lock 118. When the key 120 is inserted into the lock 118 and turned clockwise, the lock 118 will open and allow the door 112 to swing open outwardly on hinges to allow access to the mail within the interior of the receptacle 110.

Figure 2:
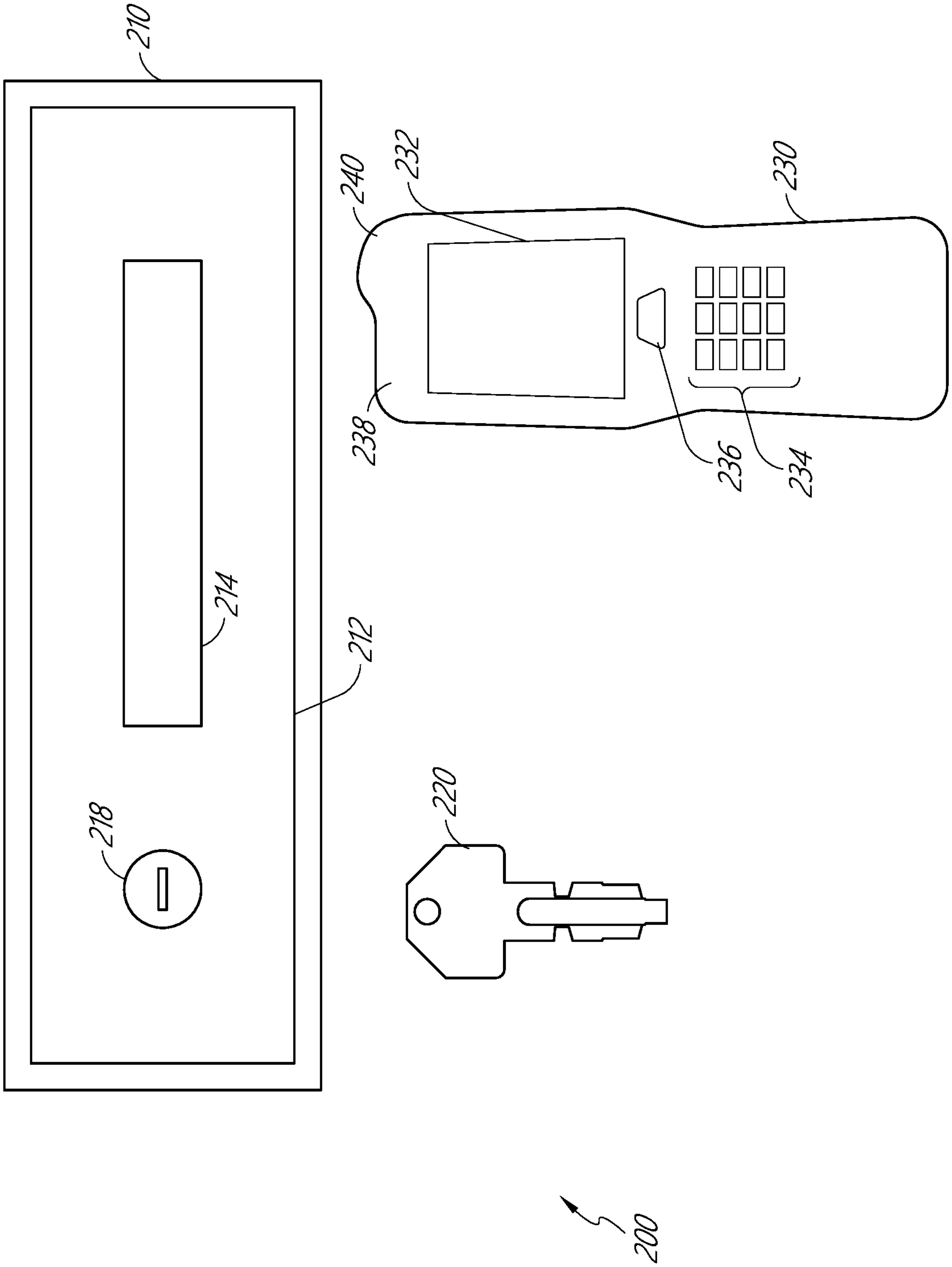
FIG. 2 is a system according to a first embodiment that includes a receptacle key and an electronic credential embodied in a handheld device.

FIG. 2 illustrates a receptacle system 200 providing increased security. The receptacle system 200 includes a front view of a receptacle 210 and a key 220. Similar to the receptacle 110 illustrated in FIG. 1, the receptacle 210 has a door 212 that includes a mail slot 214 and a lock 218. Also similar to the mail slot 114, the mail slot 112 is configured to receive outgoing mail, or alternatively, may be shaped and configured to receive other items that may be secured within the receptacle 210.

Although the receptacle 210, the door 212 and the mail slot 214 are each illustrated as having a rectangular shaped front, it is contemplated that the front of the receptacle 210, as well as the door 212 and the mail slot 214 could be formed of different shapes including square, rounded, or rhomboid shapes. Further, although the embodiment of FIG. 2 includes both the mail slot 214 and the lock 218 built into (as integral parts of) the door 212. In other embodiments, the mail slot 214, or the lock 218 and the door 212 may be located in different sides (or top) of the receptacle 210. For example, the mail slot 214 may be located in a first side or top of the receptacle 210 and the lock 218 and the door 212 may be located in a second side or top of the receptacle 210. Further, in some embodiments, the lock 218 is located in a surface of the receptacle 210 next to the door 212, rather than as an integral part of the door 212.

Different than the receptacle 110 illustrated in FIG. 1, the receptacle 210 cannot be opened by merely inserting the key 220 into the lock 218 and rotating the key 220 to open the lock 218. Instead, the receptacle system 200 uses an electronic authentication from a handheld device 230. The handheld device 230 includes a screen 232, a keypad 234, an activator button 326, a scanner 238, and an antenna 240. Further discussion of the handheld device 230 is provided below in connection with FIGS. 5A and 5B.

In order to open the receptacle 210, the handheld device 230 including the electronic credential must be brought into proximity with the lock 218, which will perform a handshake, provide the electronic credential, provide a token, or similar authentication process with an electronic lock portion (not shown) of the lock 218. The electronic lock portion will actuate upon authentication or signal from the handheld device 230. Actuating the electronic lock portion will disengage a bolt blocking mechanism or feature. The key 220 can then be turned within the lock 218 to retract an interior bolt (not shown) and allow the door 212 of the receptacle 210 to open. Without the electronic authentication, the key 220 cannot be turned in the lock 218, and the item receptacle 210 cannot be opened. Although the illustrated embodiment of FIG. 2 includes an interior bolt as part of the lock 218, other types of mechanical locking mechanisms known in the art can be substituted.

Figure 3:
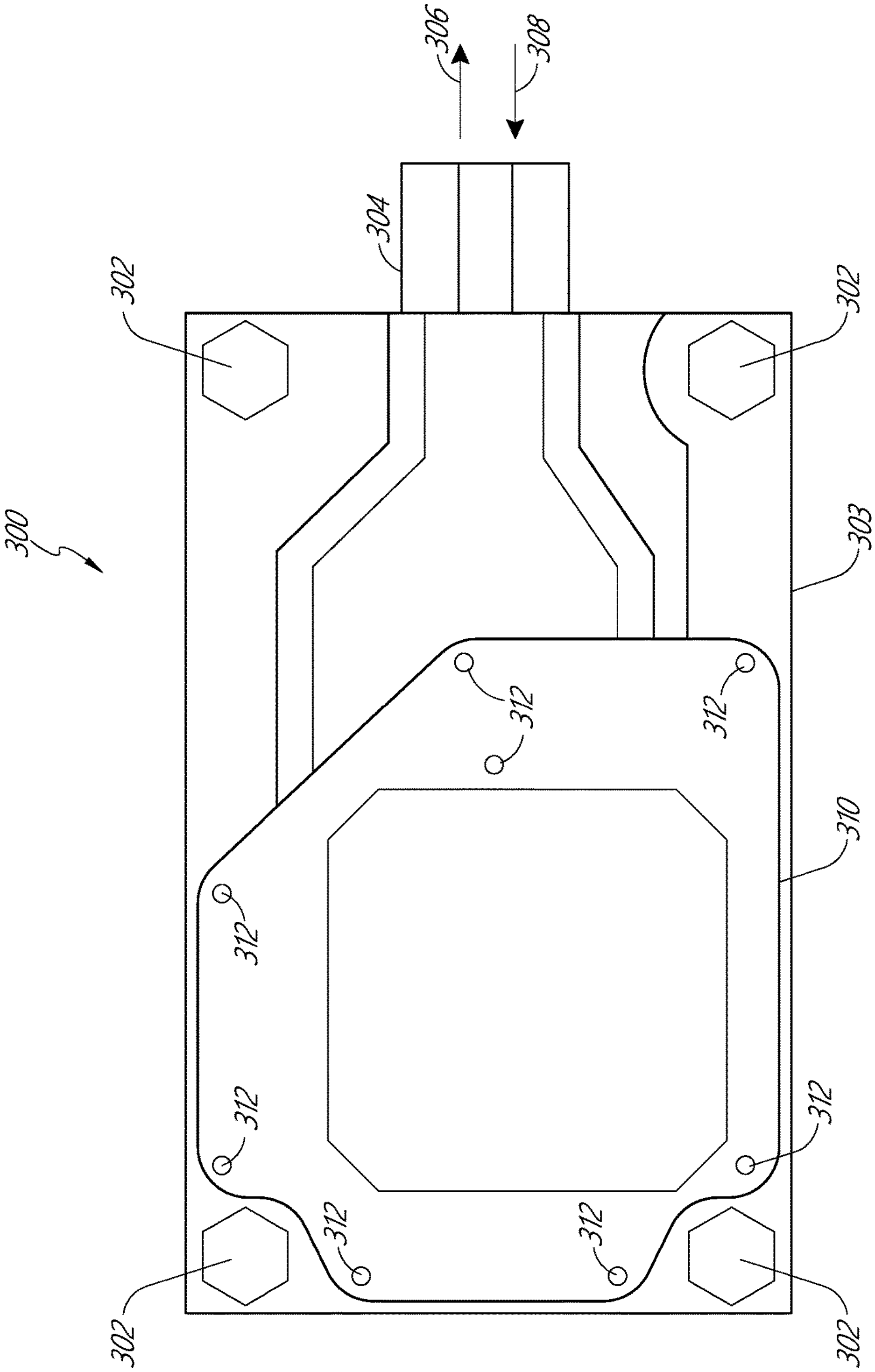
FIG. 3 is top plan view of an electronic locking device.

FIG. 3 illustrates an electronic locking device 300 from an exemplary interior of a receptacle of the present disclosure. The electronic locking device 300 includes a plate 301 which is attached to a body 303 via attachment bolts 302. The plate 301 includes a void therein (not shown) that is covered by a cover 310. The cover 310 is attached to the plate 301 by screws 312. The electronic locking device 300 also includes a locking bolt 304 that moves in a locking direction 306 outwardly from the electronic locking device (to extend the locking bolt 304), and an unlocking direction 308 towards the electronic locking device 300 (to retract the locking bolt 304). The cover 310 encloses a space in the locking device 300 which houses lock operation components, including electronics (not shown) which power and operate the bolt 304. The electronic locking device 300 can be disposed within or on a receptacle 210 as described elsewhere herein. In some embodiments, the electronic locking device can be attached to an existing lock to provide an electronic unlocking function, by, for example, retrofitting the electronic portion on to an existing mechanical lock.

Figure 4A:
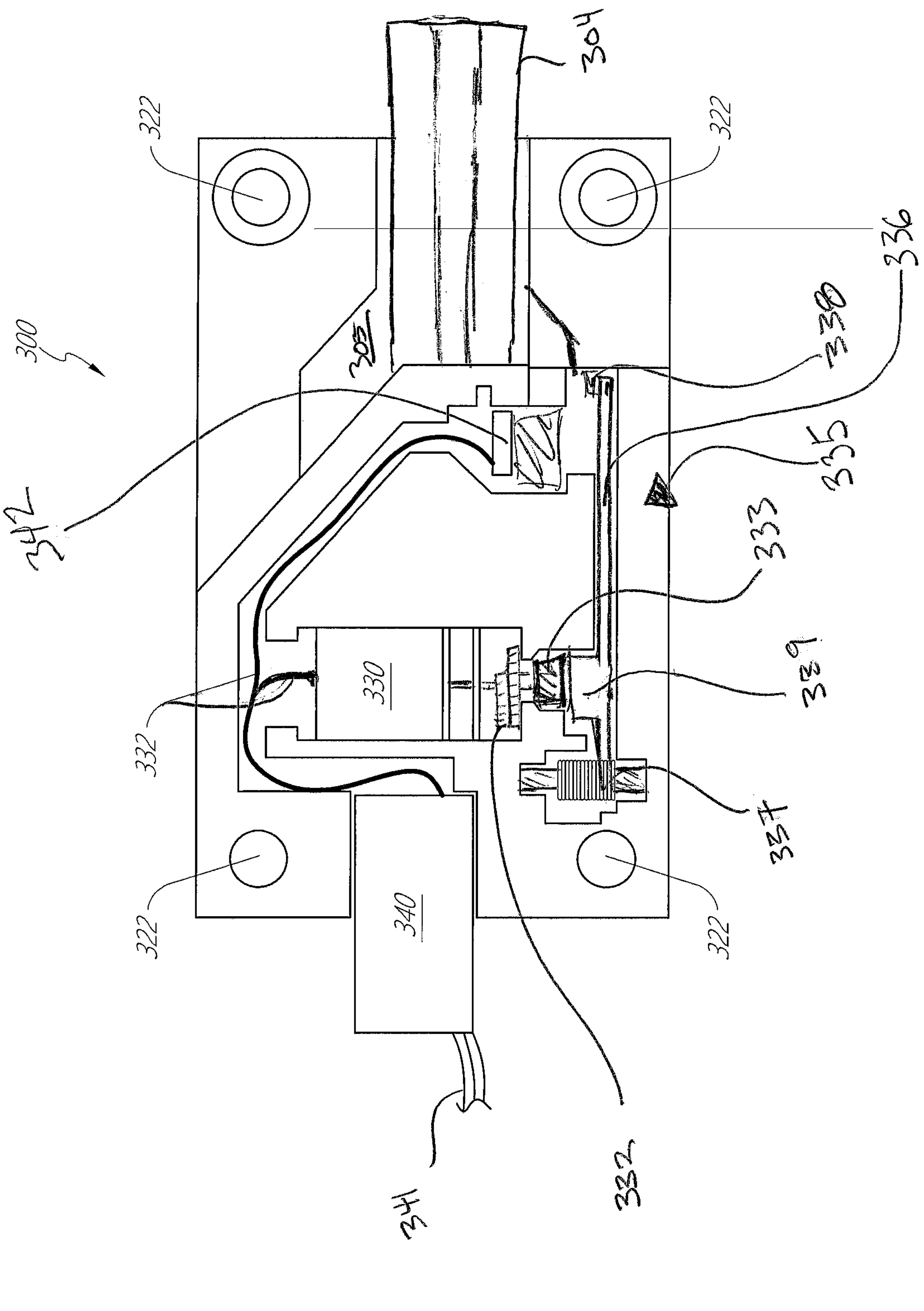
FIG. 4A is an interior view of the electronic locking device illustrated in FIG. 3.

FIG. 4 illustrates an interior view of the electronic locking device 300. The interior view of FIG. 4 has removed the cover 310 and the plate 301. Within the electronic locking device 300 are a channel 305, an electronics module 340, a motor 330, and a blocking assembly 335. The channel 305 is formed within the body 303, and may be a depression formed in a metal component of the body 303. The channel 305 is sized and shaped to receive the bolt 304, and is configured to permit movement of the bolt 304 in the directions 306 and 308 as the lock operates. The bolt 304 is disposed within the channel 305. The bolt 304 includes an extending portion (not shown) which extends under the electronics portion. The extending portion interacts with unlocking features connected to the key and the lock for moving the bolt via turning the key. The extending portion also interacts with the blocking assembly 335. The body 303 includes holes 322 which are configured to receive the attachment bolts 302.

As depicted, the motor 330 is an electric motor which receives power via one or more wires 332. The motor 330 is connected to and configured to operate one or more gears 332. The one or more gears 332 are in mechanical communication with a cam 333. The cam 333 is configured to rotate as the one or more gears 332 rotate due to the operation of the motor 330. The cam 333 is disposed within the body 303 proximate components of the blocking assembly 335.

The blocking assembly 335 is positioned within the body 303, and is configured to provide a mechanical block to the movement of the bolt 304, as will be described in greater detail below. The blocking assembly 335 comprises a lever arm 336, a resilient member 337, a bolt block 338, and a contact portion 339. The lever arm 336 is an elongate member extends along a portion of the length of the body 303 between the resilient member and the bolt block 338. The lever arm 336 is moveably connected to the body proximate the resilient member 337. The resilient member 337 is mechanically connected to the lever arm 336 at a first end of the lever arm 336, and biases the lever arm 336 to a first position. The second end of the lever arm 336 is connected to the bolt block 338. The bolt block 338 extends into a portion of the channel 305 to interfere with the bolt 304 to resist movement of the bolt 304, or interacts with a feature on the bolt 304 or in the channel 305 which prevents movement of the bolt 304. In this way, the bolt block 338 prevents the movement of the bolt 304 into an unlocked position. This prevents a user from being able to move the bolt 304 (and thus unlock the lock) while the bolt block 338 is engaged. The user can move the bolt 304, by inserting a key into a lock (not shown) and turning the key, only when the bolt block 338 is disengaged. In some embodiments the bolt block 338 or an electric block 342 can interfere with the operation of the lock, such as preventing rotation of the drum of the lock, or in any other desired way.

The lever arm 336 is connected to a contact portion 339, at a point proximate the cam 333. The contact portion 339 is not in contact with the cam 333 when the motor 330 is not in operation. In some embodiments, the contact portion 339 is in contact with the cam 333, but the cam 333 is not applying a moving force to the contact portion 339.

When the motor 330 operates, a shaft of the motor spins, thus spinning the one or more gears 332. The one or more gears 332 spin rotating the cam 333. The cam 333 is sized and shaped such that, as it rotates, a portion thereof will contact and impart a moving force to the contact portion 339 of the lever arm 336. As the cam 333 applies the moving force to the contact portion 339, the lever arm 336 begins to move against the bias force of the resilient member 337. This movement also causes the bolt block 338 to move out of the path of the bolt 304, or disengages a feature on the bolt 304 or in the channel 305. When the cam 333 is rotated to a specified degree, the lever arm 336 is moved to a second position, and the bolt block 338 is disengaged or moved, such that the bolt 304 can move. This allows a user to operate a key 220 in the lock 218 (see FIG. 2) to move the bolt and open the receptacle 210.

In some embodiments, the bolt block 338 may be configured to contact or actuate an electric block 342. In some embodiments, the electric block 342 can comprise a switch, bistable, solenoid, or other feature that, when actuated, can move a mechanical block into the path of the bolt 304. The electric block 342 can receive power via the one or more wires 332. In some embodiments, the electric block 342 can be a sensor to detect the position of the bolt block 338 or position of another component, such as the cam 333 or the lever arm 336 or the contact portion 339, any combination of the foregoing, or any other desired component. The electric block 342 can sense a position of a component of the electronic lock in order to send a signal to the motor 330 to stop operation, to detect when the bolt is blocked and provide an input to lock circuitry, or for any other desired function. The electric block 342 can also function with the locks depicted with regard to FIGS. 4B and 4C.

The electronic module 340 can be an electronic component including an antenna, a processor, a controller, and the like. The electronic module 340 is configured to wirelessly communicate with the handheld device 230, to transfer power from a power source 341 to the various components of the locking device 330, and to supply a control signal to the motor 330 and/or the electric block 342. The electronic module 340 can be further configured to pair with and authenticate a handheld device, such as using an RF signal, Bluetooth low energy, and the like. In some embodiments, the electronic module 340 is configured to receive an authentication signal from the handheld device 340.

When an item carrier, such as a postal carrier wishes to operate the electronic locking device 300, the carrier sends an unlock signal to the electronic module 340 via the handled device 230. If the signal is recognized, or if the handheld device 230 is authenticated, the electronic module sends an open signal to the motor 330, and/supplies operational power to the motor 330. The components of the locking device 330 operate as described herein to remove the bolt block, or to unblock the bolt 304. The item carrier can then use a key to open the lock on the receptacle.

Figure 4B:
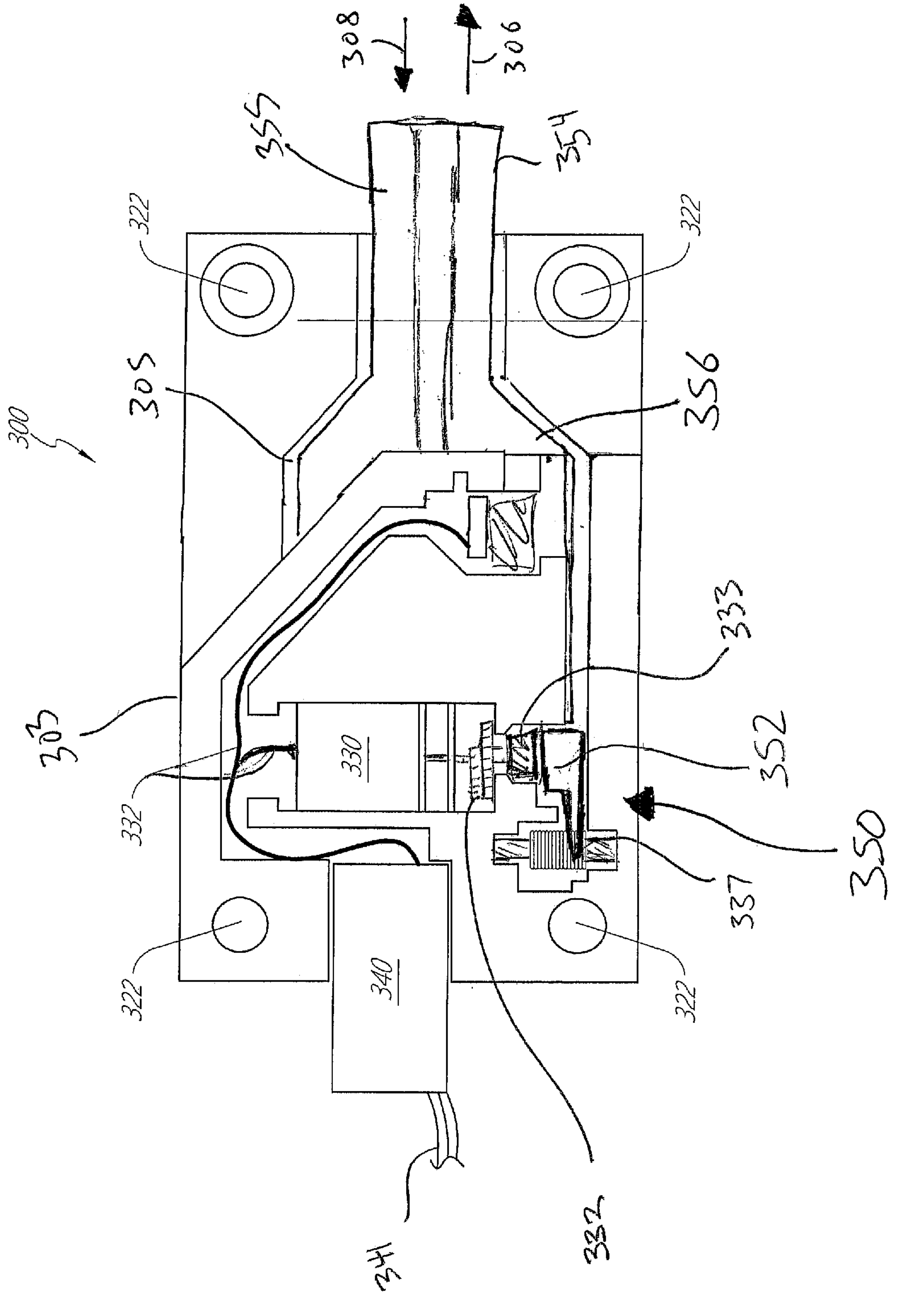
FIG. 4B is an interior view of a further embodiment of the electronic locking device illustrated in FIG. 3.
Figure 4C:
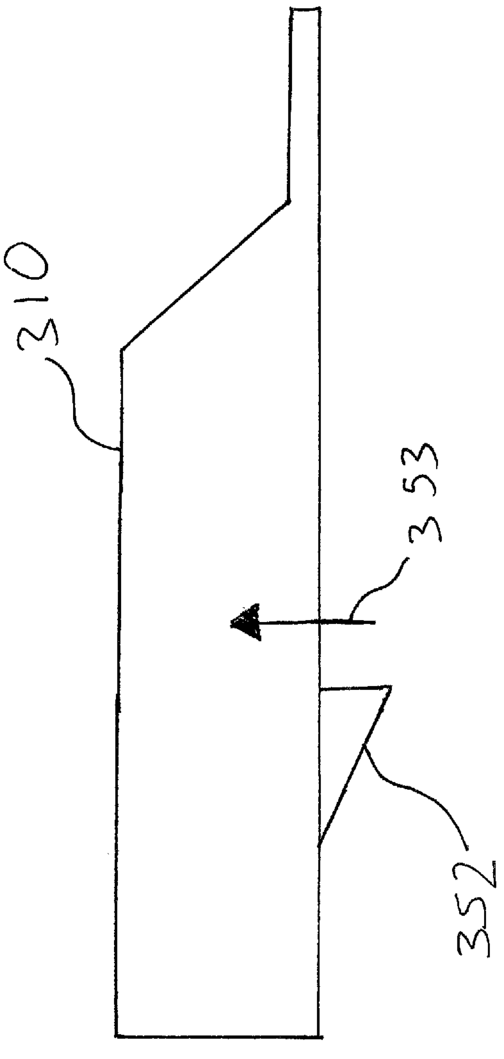
FIG. 4C is a side view of a cover portion of the electronic locking device illustrated in FIG. 4B.

FIGS. 4B and 4C illustrates an interior view of an alternative embodiment of the electronic locking device 300 of FIG. 3. The interior view of FIG. 4B has removed a portion of the cover 310 such that interior components of the cover 310 are visible. Within the electronic locking device 300 are the channel 305, the electronics module 340, the motor 330, and the blocking assembly 350 as described with regard to FIG. 4A. The channel 305 is formed within the body 303, and may be a depression formed in a metal component of the body 303. The channel 305 is sized and shaped to receive a bolt 354, and is configured to permit movement of the bolt 354 in the directions 306 and 308 as the lock operates. The bolt 354 is disposed within the channel 305. The bolt 354 includes a narrow portion 355 sized to fit with a receiving channel in a structure adjacent to the lock, and a widened portion 356 sized to fit within the relatively larger width of the channel 305. The bolt includes an extending portion (not shown) which extends under the electronics portion. The extending portion interacts with unlocking features connected to the key and the lock for moving the bolt via turning the key. The extending portion also interacts with the blocking assembly 350. The body 303 includes holes 322 which are configured to receive the attachment bolts 302.

As depicted, the motor 330 is an electric motor which receives power via one or more wires 332. The motor 330 is connected to and configured to operate one or more gears 332. The one or more gears 332 are in mechanical communication with the cam 333. The cam 333 is configured to rotate as the one or more gears 332 rotate due to the operation of the motor 330. The cam 333 is disposed within the body 303 proximate components of the blocking assembly 350.

The blocking assembly 350 is positioned within the body 303, and is configured to provide a mechanical block to the movement of the bolt 354, as will be described in greater detail below. The blocking assembly 350 comprises a bolt block 352, such as a wedge, and a resilient member 337. The resilient member 337 is mechanically connected to the bolt block 352 at a first end, and biases the bolt block 352 to a first position in which the bolt block 352 extends into a portion of the channel 305 to interfere with the bolt 354 to resist movement of the bolt 354, or interacts with the extending portion of the bolt 304 or in the channel 305 which prevents movement of the bolt 354. FIG. 4C illustrates the bolt block 352 in a first position, in which the bolt block 352 extends out of the cover 310. In this way, the bolt block 352 prevents the movement of the bolt 354 into an unlocked position. This prevents a user from being able to move the bolt 354 (and thus unlock the lock) while the bolt block 352 is engaged. The user can move the bolt 354, by inserting a key into a lock (not shown) and turning the key, only when the bolt block 352 is disengaged. In some embodiments, the bolt block 352 can interfere with the operation of the lock, such as preventing rotation of the drum of the lock, or in any other desired way.

When the motor 330 operates, a shaft of the motor spins, thus spinning the one or more gears 332. The one or more gears 332 spin, thus rotating the cam 333. The cam 333 is sized and shaped such that, as it rotates, a portion thereof will contact and impart a moving force to the bolt block 352. As the cam 333 applies the moving force to the bolt block 352, the bolt block 352 begins to move against the bias force of the resilient member 337. This movement causes the bolt block 352 to move along direction 353 such that the bolt block 352 retracts into the cover 310 and out of the path of the bolt 354, or disengages a feature on the bolt 354 or in the channel 305. This allows a user to operate a key 220 in the lock 218 (see FIG. 2) to move the bolt and open the receptacle 210.

In some embodiments, the resilient member biases the bolt block in a second position. The cam 333, during a locked mode, pushes on the bolt block 352 such that the bolt block 352 extends outward to the second position to block the bolt 354. The resilient member 337 is under a force from the cam 333. When the electronic credential is received, the motor 330 operates to move the cam 333. The movement of the cam 333 causes the resilient member 337 to relax and to move, pull, or cause the bolt block 352 to retract and move out of the path of the bolt 354.

The electronic module 340 can be an electronic component including an antenna, a processor, a controller, and the like. The electronic module 340 is configured to wirelessly communicate with the handheld device 230, to transfer power from a power source 341 to the various components of the locking device 330, and to supply a control signal to the motor 330 and/or the electric block 342. The electronic module 340 can be further configured to pair with and authenticate a handheld device, such as using an RF signal, Bluetooth low energy, and the like. In some embodiments, the electronic module 340 is configured to receive an authentication signal from the handheld device 340.

When an item carrier, such as a postal carrier wishes to operate the electronic locking device 300, the carrier sends an unlock signal to the electronic module 340 via the handled device 230. If the signal is recognized, or the handheld device 230 is authenticated, the electronic module sends an open signal to the motor 330, or supplies operational power to the motor 330. The components of the locking device 330 operate as described herein to remove the bolt block 352, or to unblock the bolt 354. The item carrier can then use a key to open the lock on the receptacle.

In some embodiments, an electronic credential may be used to authenticate the handheld device 230 or the locking device 300. The electronic credential may be a token or other electronic code that activates a lock in a receptacle such that the lock can then be mechanically opened. In some embodiments, the electronic credential is an actively transmitting signal. The actively transmitting signal may be a radiofrequency signal. In some embodiments, the radiofrequency signal is an RFID signal.

Figure 5B:
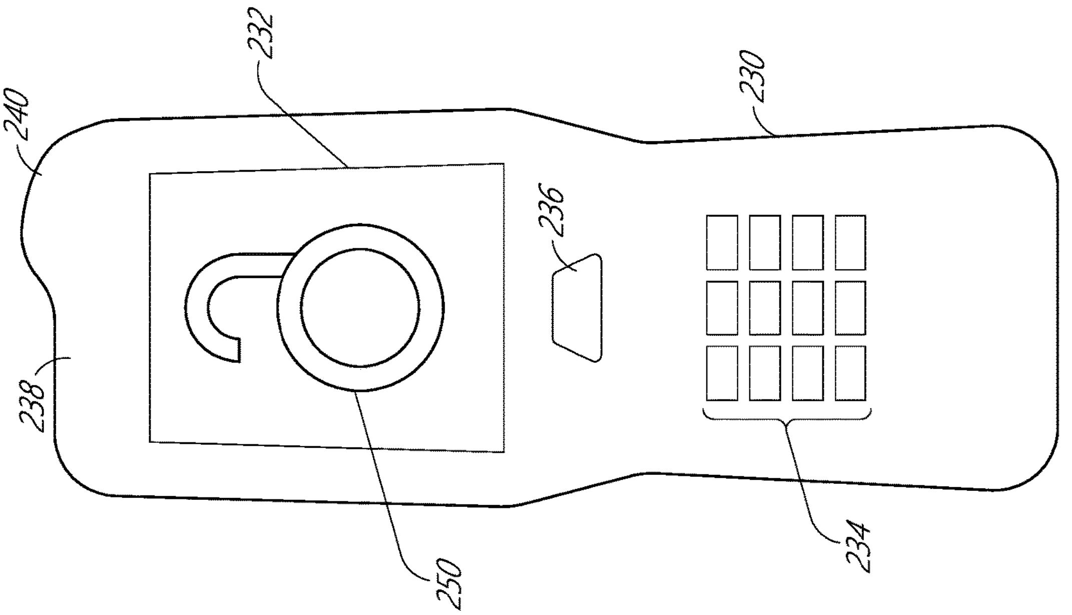
FIG. 5B is a front view of the electronic credential embodied in a handheld device of FIG. 5A having a display showing a logo that indicates an unlocked configuration.
Figure 5A:
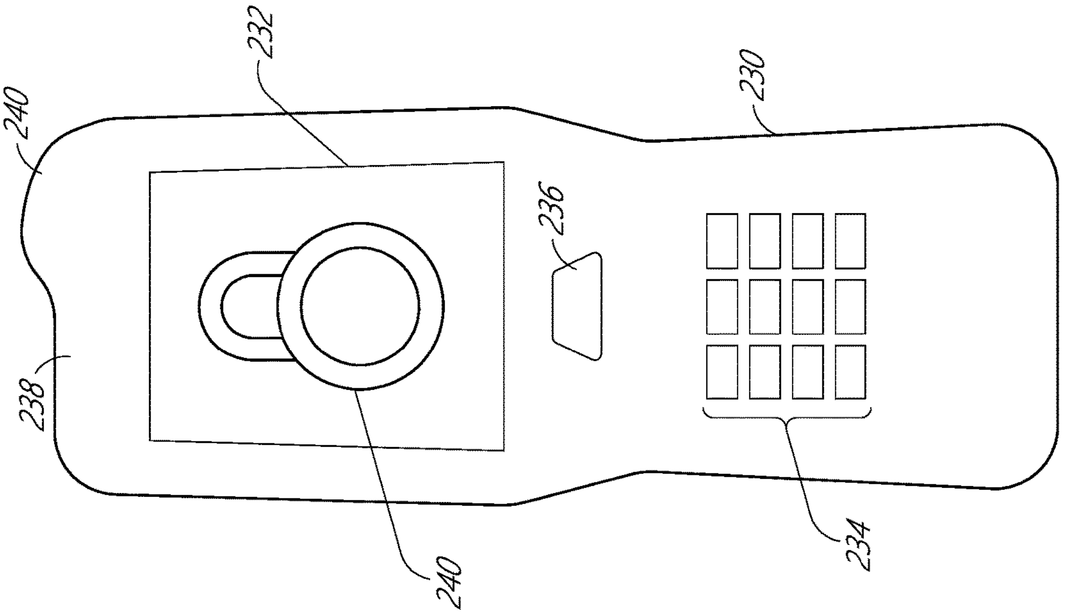
FIG. 5A is a front view of electronic credential embodied in a handheld device having a display showing a logo that indicates a locked configuration.

In some embodiments, as in the handheld devices illustrated in FIGS. 2, 5A, and 5B, the handheld device 230 must be brought into close proximity to the lock 300 before the electronic credential may be recognized by the lock, thereby allowing the lock to be opened. In some embodiments, the close proximity is less than 20 feet from the lock. In some embodiments, the close proximity required can be any desired proximity within the transmitting range of the handheld device 230.

In some embodiments, the electronic credential is an actively transmitted signal from a source within a vehicle. Thus, when the vehicle is brought within proximity to the receptacle, the actively transmitted signal will be recognized by the electronic lock and allow it to be mechanically opened by insertion and operation of a key. In some embodiments, the vehicle including the electronic credential must be within a predetermined proximity of, for example, 100 yards from the electronic lock before the lock will be activated and allowed to be opened. Thus, in some embodiments, a mail carrier might park a vehicle with an electronic credential and then walk to and mechanically open any and all electronic locks within a determined radius, such as within 100 yards of the parked vehicle. The predetermined distance can be varied by varying the power of the credential transmitter to limit the operational objectives of the locking system. Thus, in some embodiments, the vehicle might need to be driven close to a lock before the lock can be activated. In some embodiments, the electronic credential embedded within the vehicle may not function to activate a lock unless the vehicle is turned on or otherwise running. In some embodiments, the electronic credential embedded within the vehicle may activate locks even when the vehicle is turned off, is parked, or is otherwise not running.

In some embodiments, the electronic credential is a passive signal. In some embodiments, the passive signal must be both brought into proximity of an electronic lock, and must also actively initiated before a signal is sent to the lock. In some embodiments, the activation is pressing a button or scanning a code. A passive signal could be embodied within a vehicle or embodied within a handheld device. In some embodiments, the electronic lock propagates a radiofrequency signal to activate the electronic credential.

FIG. 5A illustrates an electronic credential embodied in a handheld device 230 showing a logo on the screen 232 that indicates a locked configuration 240. When the logo on the screen 232 illustrates the locked configuration 240 and the handheld device 230 is in proximity to a receptacle, the locking mechanism 300 will prevent the lock from being opened by a key. The depiction of the closed lock is an indication that no signal or credential has been sent to the electronic locking device 300, or that the signal or credential was not verified.

FIG. 5B is a view of the electronic credential embodied in the handheld device of FIG. 5A showing a logo on the screen 232 that indicates an unlocked configuration 250. When the logo on the screen 232 illustrates the unlocked configuration 250 and the handheld device 230 is in proximity to a receptacle, the lock will be mechanically openable by a key. The depiction of the open lock is an indication that a signal or credential has been sent to the electronic locking device 300, or that the signal or credential was verified.

In some embodiments, the screen 232 is a touchscreen. When the handheld device 230 shows a logo in a locked configuration 240, a touch or tap on the touchscreen will cause the handheld device to transmit the signal or credential to allow the lock to be opened with a key. When the logo changes to an unlocked configuration 250, this indicates that the signal or credential has been sent to the lock and/or that the signal or credential has been received and accepted by the lock. In some embodiments, the open lock configuration 250 indicates that the locking device 300 operated as described elsewhere herein to unblock the bolt 304, and that the locking device 300 returned a signal to the handheld device 230 indicating that the bolt 304 is not blocked, or that the lock is openable by a key. In some embodiments, the touch requires a tap or swipe of a user's finger across the screen 232. In some embodiments, the touch requires a tap or swipe of a stylus across the screen 232.

In some embodiments, changing the locked configuration 240 to the unlocked configuration 250 or changing the unlocked configuration 250 to a locked configuration 240 includes a user pressing one or more of the activator button 236, a button on the keypad 234 a combination of buttons on the keypad or scanning a code with the scanner 238. In some embodiments, a delivery resource, such as a carrier, must input a code, a login, a password, via the keypad 234. In some embodiments, the combination of buttons on the keypad is a code.

Figure 6:
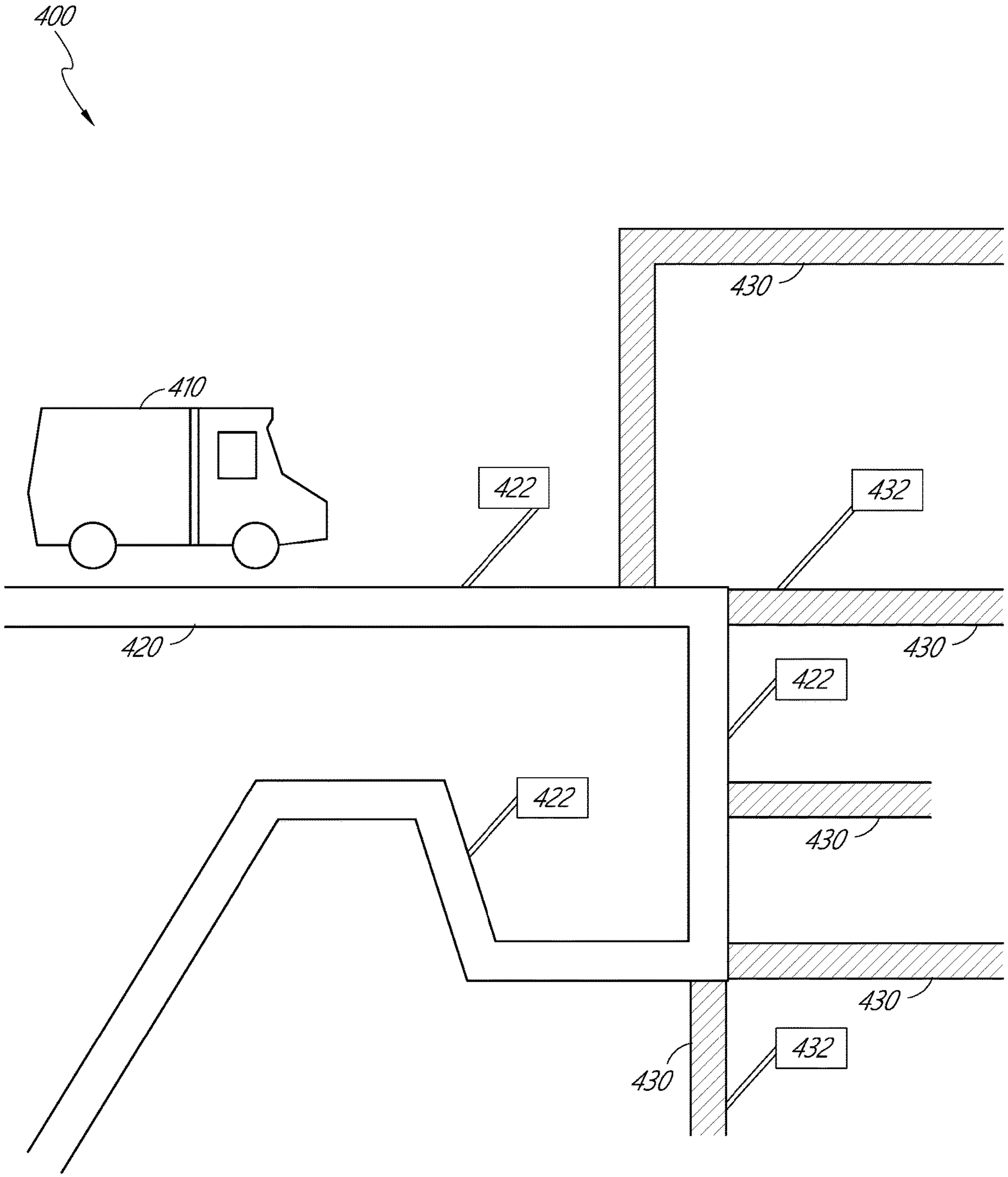
FIG. 6 illustrates a system showing a vehicle, a predetermined route, and receptacle systems.

FIG. 6 illustrates a system 400 showing a vehicle 410, a predetermined route 420, and a plurality of incorrect routes 430. Along the predetermined route 420 are receptacle systems 422. The receptacle systems 422 can be similar to receptacles 210 having electronic locking devices similar to electronic locking devices 300 described herein. Along the incorrect routes 430 are receptacle systems 432. The vehicle 410 includes an electronic credential for locking or unlocking the receptacle systems 422 along the predetermined route 420. In some embodiments, customers or recipients associated with the receptacle systems 422, 432 may register their receptacle systems 422, 432 in conjunction with address information, recipient information, or the like, to enable route-based authentication of the electronic locks within the receptacle systems 422, 432.

In some embodiments, a handheld device 230 or a vehicle 410 can be loaded or signals can be sent to the handheld device 230 or the vehicle 410 containing credentials for opening electronic locks which are along the route assigned to the handheld device 230 or the vehicle 410. This can occur where each lock has a specific credential. When the handheld device 230 and/or vehicle 410 is assigned a route for the day, a server can send the correct credentials for locks along the assigned route to the handheld device 230 and/or the vehicle 410.

In some embodiments, the credential for unlocking locks, including those on an assigned route and those not on an assigned route, is the same for all locks, but the sending of a credential to the lock from a vehicle or handheld device has a geographic location check as well. For example, when a handheld device 230 or vehicle 410 arrives at a receptacle system 422, which can be associated with and/or located at a specific address or delivery point, similar to those described elsewhere herein, the handheld device 230 or the vehicle 410 can initiate an unlocking operation. The handheld device 230 or the vehicle 410 sends a request for a credential to a remote server. Along with the request for the credential, the geographic coordinates of the handheld device 230 or the vehicle 410 are also sent. The server can check the geographic coordinates received against the known coordinates for receptacle systems 422 along the route assigned to the handheld device 230 or vehicle 410. If the geographic coordinates indicate that the handheld device or vehicle 410 are in proximity to a receptacle system 422 along the correct route, the server can send the credential back to the handheld device 230 or the vehicle 410, or directly to the locking mechanism 300. In some embodiments, this process can occur locally on the handheld device 230.

Once the handheld device 230 or the vehicle 410 receives the credential, the credential is sent to the electronic locking device 300, and the electronic locking device 300 operates to allow the lock to be opened with a physical key.

The electronic credential may be embedded into the vehicle 410 or be part of a handheld device such as described herein. While the vehicle 410 is proceeding along the predetermined route 420, each of the receptacle systems 422 may be openable as the vehicle 410 approached within a close proximity. If the vehicle 410 exits the predetermined route 420 onto any of the incorrect routes 430, none of the receptacle systems 432 will be openable. In some embodiments, as a handheld device 230 or the vehicle 410 leaves the assigned route, or is not traveling along the assigned route, or where no route has been assigned to the handheld device 230 or vehicle 410, the ability of the handheld device 230 or the vehicle 410 to unlock electronic locking devices 300. This can be accomplished by the server sending a signal to the handheld device 230 or the vehicle 410 to disable the credential transmission when the handheld device 230 or the vehicle 410 is off the route.

Whether the vehicle 410 is on a predetermined route 420 or an incorrect route 430 can be determinable in real time, for example, using a global positioning system technology or sensors positioned strategically along the predetermined route. For example, sensors may be placed following the predetermined route 420 or be embedded in a cell phone tower system to help identify a precise location of the vehicle 410.

Figure 7:
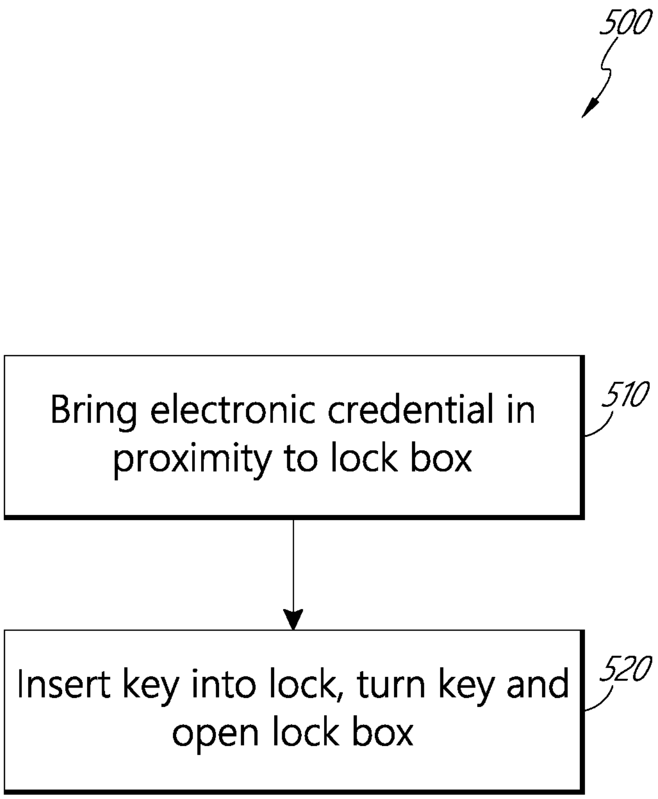
FIG. 7 is a flow chart illustrating a first method of using a receptacle system.

FIG. 7 illustrates a first method of using a receptacle system similar to those described elsewhere herein. The first method of using a receptacle system 500 is similar to some previously described embodiments. For example, a receptacle system may include an electronic credential and a receptacle having a lock as described elsewhere herein. In a first step 510, the electronic credential or a device having an electronic credential thereon is brought in proximity to a lock. The electronic credential may be part of a handheld device or it may be embedded in a vehicle such as are described herein. In a second step 520, after the electronic credential is brought in proximity to the lock, a key may be inserted into the lock and turned to open the lock and thereby open the receptacle, as described elsewhere herein.

Figure 8:
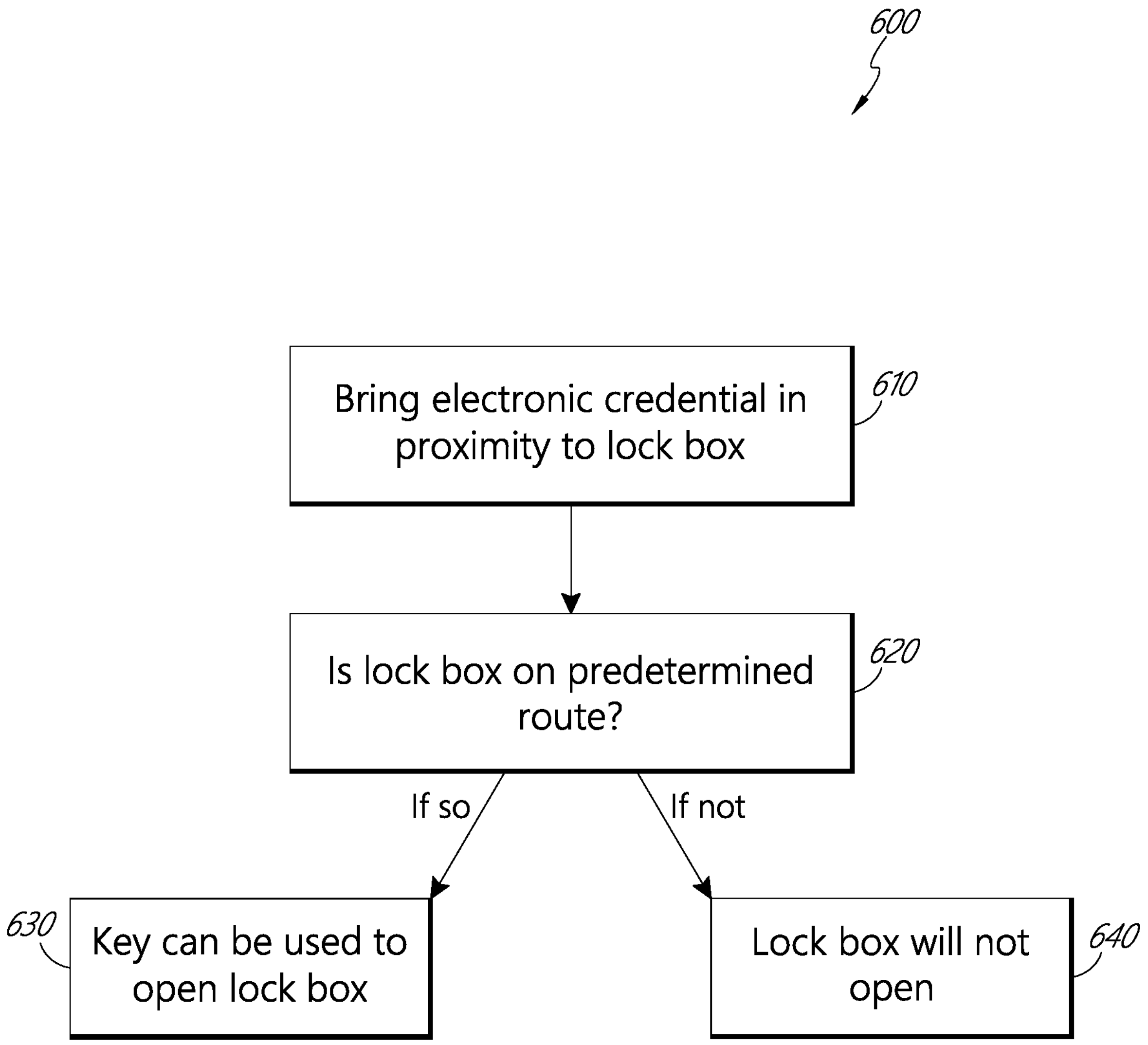
FIG. 8 is a flow chart illustrating a second method of using a receptacle system.

FIG. 8 illustrates a second method of using a receptacle system 600. This method of using a receptacle system may include an electronic credential device, a receptacle having a lock, and the electronic credential device along a predetermined route. In a first step 610, the electronic credential is brought into proximity of a receptacle. In a second step 620, a determination is made as to whether the receptacle is on a predetermined route, or a route assigned to the electronic credential device, or a route along which the electronic credential device is assigned to travel. The predetermined route can be verified using a global positioning system or other sensor technology. If the receptacle is on the predetermined route then the process 600 proceeds to step 630, wherein the lock unlocks to allow operation of the lock with a key, as described elsewhere herein. If the receptacle is not on the predetermined route, then the process 600 moves to step 640 wherein the lock does not actuate to allow key operation, and the receptacle cannot be opened with a key. Preventing operation of the lock can be accomplished by an affirmative action such as an active signal send from the electronic device to the lock, and the lock activates to prevent the lock opening, or by a lack of a signal, the absence of an activation signal fails to enable lock operation.

In at least some of the previously described embodiments, one or more elements used in an embodiment can interchangeably be used in another embodiment unless such a replacement is not technically feasible. It will be appreciated by those skilled in the art that various other omissions, additions, and modifications may be made to the methods and structures described above without departing from the scope of the claimed subject matter. All such modifications and changes are intended to fall within the scope of the subject matter, as defined by the appended claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A handheld device configured to operate an electronic lock, the handheld device comprising:

a memory configured to store a plurality of electronic credentials;

a communication circuit configured to communicate with an electronic lock; and a display configured to display an indication of a locked state or an unlocked state of the electronic lock;

wherein the handheld device is configured to:

receive an input;

transmit one of the plurality of electronic credentials to the electronic lock in response to the input; and cause a blocking assembly configured to block movement of a bolt in the electronic lock to move, thereby enabling the bolt to become manually mechanically operable by an insertion and turning of a key into the electronic lock to retract the bolt.

2. The handheld device of claim 1, wherein the display is configured to display a first logo representing the locked state of the electronic lock and the display is configured to display a second logo representing the unlocked state of the electronic lock.

3. The handheld device of claim 1, wherein the display comprises a touchscreen configured to receive the input.

4. The handheld device of claim 1, wherein the handheld device is configured to:

detect the electronic lock in proximity to the handheld device, and receive an indication of the locked or unlocked state of the electronic lock;

wherein the display is configured to display the locked or unlocked state of the electronic lock based on the received indication.

5. The handheld device of claim 1, wherein the handheld device comprises a scanner configured to receive the input.

6. The handheld device of claim 1, wherein the handheld device comprises a location detection device configured to receive the input.

7. The handheld device of claim 1, wherein the input comprises a radiofrequency signal transmitted by the electronic lock and received by the handheld device.

8. The handheld device of claim 1, wherein the handheld device is configured to receive, from the electronic lock, an electronic lock identifier.

9. The handheld device of claim 1, wherein the handheld device is configured to receive, from the electronic lock, a signal indicating acceptance of the electronic credential.

10. A handheld device configured to operate an electronic lock portion of a lock assembly, the handheld device comprising:

a memory configured to store a plurality of electronic credentials; and a communication circuit configured to electronically communicate with the electronic lock portion;

wherein the handheld device is configured to:

receive an input from the electronic lock portion;

transmit one of the plurality of electronic credentials to the electronic lock portion; and cause a blocking assembly configured to block movement of a bolt in the electronic lock portion to move in response to transmitting the one of the plurality of electronic credentials, thereby selectively enabling the bolt to become manually operable by an insertion and turning of a key into the lock assembly to retract the bolt.

11. The handheld device of claim 10, wherein causing the blocking assembly in the electronic lock portion to move in response to transmitting the one of the plurality of electronic credentials, moves the blocking assembly between a first position and a second position.

12. The handheld device of claim 11, wherein in the first position, the blocking assembly prevents retraction of a manually operable bolt into the lock, and wherein in the second position, the blocking assembly does not prevent retraction of the manually operable bolt into the lock.

13. The handheld device of claim 10, wherein the handheld device is configured to:

detect the electronic lock portion in proximity to the handheld device, and receive an indication of a locked or unlocked state of the electronic lock portion;

wherein the handheld device further comprises a display configured to display the locked or unlocked state of the electronic lock portion based on the received indication.

14. The handheld device of claim 10, wherein the handheld device comprises a scanner configured to receive the input.

15. The handheld device of claim 10, wherein the handheld device comprises a location detection device configured to receive the input.

16. The handheld device of claim 10, wherein the input comprises a radiofrequency signal transmitted by the electronic lock portion and received by the handheld device.

17. The handheld device of claim 10, wherein the handheld device is configured to receive, from the electronic lock portion, an electronic lock identifier.

18. The handheld device of claim 10, wherein the handheld device is configured to receive, from the electronic lock portion, a signal indicating acceptance of the electronic credential.

* * * * *